(12) United States Patent
Batistatos et al.

(10) Patent No.: US 8,740,253 B2
(45) Date of Patent: Jun. 3, 2014

(54) RADIATION CURABLE EMBOSSED INK SECURITY DEVICES FOR SECURITY DOCUMENTS

(75) Inventors: Odisea Batistatos, Glenroy (AU); Gary Fairless Power, Greenvale (AU)

(73) Assignee: Innovia Security Pty Ltd, Graigieburn, Victoria (AU)

( * ) Notice: Subject to any disclaimer, the term of this patent is extended or adjusted under 35 U.S.C. 154(b) by 873 days.

(21) Appl. No.: 12/441,449

(22) PCT Filed: Sep. 14, 2007

(86) PCT No.: PCT/AU2007/001370
§ 371 (c)(1),
(2), (4) Date: Jun. 18, 2009

(87) PCT Pub. No.: WO2008/031170
PCT Pub. Date: Mar. 20, 2008

(65) Prior Publication Data
US 2010/0037326 A1    Feb. 11, 2010

(30) Foreign Application Priority Data

Sep. 15, 2006   (AU) ............................... 2006905115

(51) Int. Cl.
*B42D 15/00*    (2006.01)
(52) U.S. Cl.
USPC .................. 283/91; 283/72; 283/85; 283/106
(58) Field of Classification Search
CPC ........................ B42D 2033/22; B42D 2033/24
USPC .......................................... 283/72, 85, 91, 111
See application file for complete search history.

(56) References Cited

U.S. PATENT DOCUMENTS

| | | | |
|---|---|---|---|
| 4,758,296 A | 7/1988 | McGrew | |
| 5,712,731 A * | 1/1998 | Drinkwater et al. | 283/72 |
| 5,815,292 A | 9/1998 | Walters | |
| 5,856,048 A * | 1/1999 | Tahara et al. | 283/85 |
| 6,062,604 A | 5/2000 | Taylor et al. | |
| 6,277,232 B1 * | 8/2001 | Wang et al. | 283/72 |
| 6,471,248 B2 * | 10/2002 | Hardwick et al. | 283/72 |
| 6,476,840 B1 | 11/2002 | Taylor et al. | |
| 6,758,936 B1 * | 7/2004 | Kiekhaefer et al. | 283/72 |
| 2005/0179253 A1 | 8/2005 | Rivera et al. | |

FOREIGN PATENT DOCUMENTS

| | | |
|---|---|---|
| EP | 1 527 902 A2 | 5/2005 |
| WO | WO 03/055692 A1 | 7/2003 |
| WO | WO2005/049745   * | 6/2005 |
| WO | WO 2005/106601 | 11/2005 |
| WO | WO 2006/095161 | 9/2006 |

* cited by examiner

*Primary Examiner* — Kyle Grabowski
(74) *Attorney, Agent, or Firm* — Greer, Burns & Crain, Ltd.

(57) ABSTRACT

A security document and a method of manufacturing a security document are provided in which a radiation curable ink is applied to at least one side of a substrate including at least one region of transparent plastics material forming a window or half-window area. The ink is embossed while soft and cured with radiation to form an embossed security device within the window or half-window area including one or more of a diffractive structure, a lens structure or other security element having a relief structure.

17 Claims, 5 Drawing Sheets

RADIATION CURABLE EMBOSSED INK SECURITY DEVICES FOR SECURITY DOCUMENTS

FIELD OF THE INVENTION

This invention relates to security documents and tokens, and is particularly concerned with providing a security document or token with at least one enhanced security device or feature, and also an improved method of manufacturing security devices and features.

DEFINITIONS

Security Document

As used herein the term security document includes all types of documents and tokens of value and identification documents including, but not limited to the following: items of currency such as banknotes and coins, credit cards, cheques, passports, identity cards, securities and share certificates, driver's licenses, deeds of title, travel documents such as airline and train tickets, entrance cards and tickets, birth, death and marriage certificates, and academic transcripts.

The invention is particularly, but not exclusively, applicable to security documents such as banknotes or identification documents such as identity cards or passports formed from a substrate to which one or more layers of printing are applied.

Substrate

As used herein, the term substrate refers to the base material from which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET); or a composite material of two or more materials, such as a laminate of paper and at least one plastic material, or of two or more polymeric materials.

The use of plastic or polymeric materials in the manufacture of security documents pioneered in Australia has been very successful because polymeric banknotes are more durable than their paper counterparts and can also incorporate new security devices and features. One particularly successful security feature in polymeric banknotes produced for Australia and other countries has been a transparent area or "window".

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T < L_0$, where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Security Device or Feature

As used herein the term security device or feature includes any one of a large number of security devices, elements or features intended to protect the security document or token from counterfeiting, copying, alteration or tampering. Security devices or features may be provided in or on the substrate of the security document or in or on one or more layers applied to the base substrate, and may take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms and diffractive optical elements (DOEs).

Diffractive Optical Elements (DOEs)

As used herein, the term diffractive optical element refers to a numerical-type diffractive optical element (DOE). Numerical-type diffractive optical elements (DOEs) rely on the mapping of complex data that reconstruct in the far field (or reconstruction plane) a two-dimensional intensity pattern. Thus, when substantially collimated light, e.g. from a point light source or a laser, is incident upon the DOE, an interference pattern is generated that produces a projected image in the reconstruction plane that is visible when a suitable viewing surface is located in the reconstruction plane, or when the DOE is viewed in transmission at the reconstruction plane. The transformation between the two planes can be approximated by a fast Fourier transform (FFT). Thus, complex data including amplitude and phase information has to be physically encoded in the micro-structure of the DOE. This DOE data can be calculated by performing an inverse FFT transformation of the desired reconstruction (i.e. the desired intensity pattern in the far field).

DOEs are sometimes referred to as computer-generated holograms, but they differ from other types of holograms, such as rainbow holograms, Fresnel holograms and volume reflection holograms.

BACKGROUND OF THE INVENTION

A window formed in a security document is particularly suited for incorporating a security device, such as a diffraction grating or hologram. The usual method of incorporating a diffraction grating or hologram in a security documents is to emboss the required diffractive relief structure onto a transfer foil of metallic material, and to transfer the foil bearing the diffractive structure on to the required area of the security documents in a hot stamping operation. This is a relatively expensive process which is not particularly suitable for the mass production of security documents such as bank notes or the like.

Another method of producing diffractive structures in security documents is disclosed in our International Patent Application No. WO01/00418 in which an optically diffractive structure is formed by irradiation of an area of the substrate by laser ablation. Whilst such a laser ablation process can reduce the cost of providing diffractive structures in bank notes or the like, the process still involves the use of relatively expensive laser equipment.

It is therefore desirable to provide a security documents with a security device including an embossed relief structure, which can be integrated in to the document in a simpler, less expensive process.

It is also desirable to provide a security document or device of a more complex nature, which can produce different visual effects and/or be used for different purposes, such as for verifying a security feature at another part of the security document.

Further, many security documents, such as banknotes, have several different security features in different areas of the note. This can be confusing for the public, but is a necessity imposed by applying security features by different methods which requires relatively large tolerances, typically of at least 1.5-2.0 mm so that the features stand by themselves. It is therefore desirable to provide a process for forming multiple security features in a single area that does not require large tolerances and which is difficult to replicate.

SUMMARY OF THE INVENTION

According to one aspect of the invention, there is provided a security document comprising a substrate, including at least one region of transparent or translucent plastics material forming a window or half-window area, and a security device integrated into the window or half-window area, wherein the security device is formed from an embossed radiation curable ink, the security device including one or more of a diffractive structure, a lens structure or other security element having an embossed relief structure.

According to another aspect of the invention, there is provided a method of manufacturing a security document comprising the steps of:

providing a substrate including at least one region of transparent or translucent plastics material forming a window or half-window area;

applying an embossable radiation curable ink to at least one side of the substrate in at least the window or half-window area; and embossing the ink and curing with radiation to form a security element within the window or half-window area, wherein the embossed ink forms a security device including one or more of a diffractive structure, a lens structure or other security element having an embossed relief structure.

The substrate is preferably formed from at least one layer of transparent polymeric material with at least one opacifying layer applied to at least one side of the transparent polymeric substrate, with at least one opacifying layer omitted in the region forming the window or half-window area.

Alternatively, it is possible for the substrates to be formed from an at least partly opaque material, such as paper or fibrous material with an insert of transparent plastics material inserted into a cut-out, or recess in the paper or fibrous substrate to form the window or half-window area.

In one preferred embodiment, opacifying layers are applied to opposite sides of the substrate with the opacifying layers on both sides of the substrate omitted in one region to form a transparent window in the security documents.

In another preferred embodiment, at least one opacifying layer is applied to one side of the transparent substrate to completely cover said one side, and at least one opacifying layer is applied to the opposite side of the substrate, except in a region which forms the half-window area.

According to another aspect of the invention there is provided a security document including: a substrate formed from a transparent or translucent material; a security device provided on one side of the substrate formed from an embossed radiation curable ink; at least one opacifying layer applied to said one side of the substrate to cover the embossed security device; at least one opacifying layer applied to the opposite side of the substrate but omitted in the region of the embossed security device; wherein the embossed security device is hidden from one side of the security document by the at least one opacifying layer covering the security device, but visible from said opposite side of the security document through a half-window formed by the region in which the at least one opacifying layer on the opposite side of the substrate is omitted.

According to a further aspect of the invention there is provided a method of manufacturing a security document comprising the steps of: providing a substrate formed from a transparent or translucent material; applying a radiation curable ink to one side of the substrate; embossing the ink and curing with radiation to form an embossed security device; applying at least one opacifying layer to said one side of the substrate to cover the embossed security device; applying at least one opacifying layer to the opposite side of the substrate except in the region of the embossed security device; wherein the embossed security device is hidden from one side of the security document by the at least one opacifying layer covering the security device, but visible from said opposite side of the security document through a half-window formed by the region in which the at least one opacifying layer on the opposite side of the substrate is omitted.

Embossable Radiation Curable Ink

The term embossable radiation curable ink used herein refers to any ink, lacquer or other coating which may be applied to the substrate in a printing process, and which can be embossed while soft to form a relief structure and cured by radiation to fix the embossed relief structure. The curing process does not take place before the radiation curable ink is embossed, but it is possible for the curing process to take place either after embossing or at substantially the same time as the embossing step. The radiation curable ink is preferably curable by ultraviolet (UV) radiation. Alternatively, the radiation curable ink may be cured by other forms of radiation, such as electron beams or X-rays.

The radiation curable ink is preferably a transparent or translucent ink formed from a clear resin material. Such a transparent or translucent ink is particularly suitable for printing light-transmissive security elements such as numerical-type DOEs and lens structures.

In one particularly preferred embodiment, the transparent or translucent ink preferably comprises an acrylic based UV curable clear embossable lacquer or coating.

Such UV curable lacquers can be obtained from various manufacturers, including Kingfisher Ink Limited, product ultraviolet type UVF-203 or similar. Alternatively, the radiation curable embossable coatings may be based on other compounds, eg nitro-cellulose.

The radiation curable inks and lacquers used in the invention have been found to be particularly suitable for embossing microstructures, including diffractive structures such as DOEs, diffraction gratings and holograms, and microlenses and lens arrays. However, they may also be embossed with larger relief structures, such as non-diffractive optically variable devices.

The ink is preferably embossed and cured by ultraviolet (UV) radiation at substantially the same time. In a particularly preferred embodiment, the radiation curable ink is applied and embossed at substantially the same time in a Gravure printing process.

Preferably, in order to be suitable for Gravure printing, the radiation curable ink has a viscosity falling substantially in the range from about 20 to about 175 centipoise, and more preferably from about 30 to about 150 centipoise. The viscosity may be determined by measuring the time to drain the lacquer from a Zahn Cup #2. A sample which drains in 20 seconds has a viscosity of 30 centipoise, and a sample which drains in 63 seconds has a viscosity of 150 centipoise.

With some polymeric substrates, it may be necessary to apply an intermediate layer to the substrate before the radiation curable ink is applied to improve the adhesion of the embossed structure formed by the ink to the substrate. The intermediate layer preferably comprises a primer layer, and more preferably the primer layer includes a polyethylene imine. The primer layer may also include a cross-linker, for example a multi-functional isocyanate. Examples of other primers suitable for use in the invention include: hydroxyl terminated polymers; hydroxyl terminated polyester based co-polymers; cross-lined or uncross-linked hydroxylated acrylates; polyurethanes; and UV curing anionic or cationic acrylates. Examples of suitable cross-linkers include: isocyanates; polyaziridines; ziconium complexes; aluminium acetylacetone; melamines; and carbodi-imides.

The type of primer may vary for different substrates and embossed ink structures. Preferably, a primer is selected which does not substantially affect the optical properties of the embossed ink structure.

In another possible embodiment the radiation curable ink may include metallic particles to form a metallic ink composition which is both printable and embossable. Such a metallic ink composition may be used to print a reflective security element, such as a diffraction grating or hologram. Alternatively, a transparent ink, e.g. formed from a clear resin, may be applied on one side of the substrate, with or without an intermediate primer layer, the transparent ink then being embossed and cured with radiation and a metallic ink composition subsequently applied to the embossed transparent ink in a printing process, if it is desired to form a reflective security element as part of the security device.

It is also possible for the metallic ink composition to be applied in a layer which is sufficiently thin to allow the transmission of light.

When a metallic ink is used, it preferably comprises a composition including metal pigment particles and a binder. The metal pigment particles are preferably selected from the group comprising: aluminium, gold, silver, platinum, copper, metal alloy, stainless steel, nichrome and brass. The metallic ink preferably has a low binder content and a high pigment to binder ratio. Examples of metallic ink compositions suitable for use in the present invention are described in WO2005/049745 of Wolstenholme International Limited, which describes coating compositions suitable for use in coating a diffraction grating comprising metal pigment particles and a binder, wherein the ratio of pigment to binder is sufficiently high as to permit the alignment of the pigment particles to the contours of the diffraction grating. Suitable binders may comprise any one or more selected from the group comprising nitrocellulose, ethyl cellulose, cellulose acetate, cellulose acetate propionate (CAP), cellulose acetate butyrate (CAB), alcohol soluble propionate (ASP), vinyl chloride, vinyl acetate co-polymers, vinyl acetate, vinyl, acrylic, polyurethane, polyamide, rosin ester, hydrocarbon, aldehyde, ketone, urethane, polyethyleneterephtha late, terpene phenol, polyolefin, silicone, cellulose, polyamide and rosin ester resins. In one particularly preferred metallic ink composition, the binder comprises nitro cellulose and polyurethane.

The pigment to binder ratio preferably falls substantially within the range from about 5:1 to about 0.5:1 by weight, and more preferably falls substantially within the range from about 4:1 to about 1:1 by weight.

The metal pigment content by weight of the composition is preferably less than about 10%, and more preferably less than about 6%. In particularly preferred embodiments, the pigment content by weight of the composition falls substantially in the range from about 0.2% to about 6%, and more preferably from about 0.2% to about 2%.

The average particle diameter may be in the range from about 2 μm to about 20 μm, preferably in the range from about 5 μm to about 20 μm, and more preferably in the range from about 8 μm to about 15 μm.

The thickness of the pigment particles is preferably less than about 100 nm and more preferably less than about 50 nm. In one embodiment, the thickness of the pigment particles falls substantially within the range from 10-50 nm. In another embodiment, the thickness of the pigment particles falls substantially within the range from 5-35 nm, and in another embodiment the average thickness of the pigment particles falls substantially within the range from 5-18 nm.

Embossable UV curable ink compositions such as described above have been found to be particularly suitable for embossing to form optically diffractive security devices, such as diffraction gratings, holograms and diffractive optical elements. In one particularly preferred embodiment, the security device formed by the embossed metallic ink includes a numerical-type diffractive optical element (DOE). Numerical-type diffractive optical elements (DOEs) rely on the mapping of complex data that reconstruct in the far field (or reconstruction plane) a two-dimensional intensity pattern. Thus, when substantially collimated light, e.g. from a point light source or a laser, is incident upon the DOE, an interference pattern is generated that produces a projected image in the reconstruction plane that is visible when a suitable viewing surface is located in the reconstruction plane, or when the DOE is viewed in transmission at the reconstruction plane. The transformation between the two planes can be approximated by a fast Fourier transform (FFT). Thus, complex data including amplitude and phase information has to be physically encoded in the micro-structure of the DOE. This DOE data can be calculated by performing an inverse FFT transformation of the desired reconstruction (i.e. the desired intensity pattern in the far field).

Hitherto, it has only been possible to incorporate DOEs in security documents by either a hot foil transfer process or a laser ablation process, to create the desired micro-structure of the DOE. However, the development of embossable ink compositions which are printable and which can be embossed to form a diffraction grating or hologram, has now made it possible to integrate diffractive optical elements (DOEs) into printed security documents at a lower cost of manufacture. The present invention includes within its scope the integration of a printed embossed DOE into the window or half-window area of a security document, but also includes the possibility of the integration of other security elements formed from an embossed transparent or metallic ink into a window or half-window area. Other types of embossed security elements include other diffractive structures, such as holograms, lens structures and other security elements having a relief structure, such as non-diffractive optically variable devices.

The use of an embossable radiation curable ink also allows different numerical-type DOEs to be formed in security documents by printing and embossing that are more complex than simple two-dimensional DOEs recorded in the surface of an article. For instance, the embossed DOE may contain encrypted data stored within the microstructure of the DOE. The encrypted data may be stored in pixels or vector elements of the DOE, such as disclosed in WO 2007/079549 A1. Also, the DOE may store encypted data in addition to a visual image which is projected and visible in the reconstruction plane when the DOE is illuminated with collimated light. The projected visual image may be generated by a first set of pixels or vector elements and the encrypted data may be stored in a second set of pixels or vector elements of the DOE. Further. Even more complex numerical-type DOEs, such as binary DOEs, multi-level DOEs and asymmetric DOEs can be formed by printing and embossing with a radiation curable ink. Hitherto, with techniques such as laser ablation, it has generally been possible only to form single layer, centrosymmetric DOEs in security documents.

Binary DOEs and Multi-Level DOEs

A multi-level DOE is a diffractive optical element with a discrete number of phase levels wherein the number is an integer greater than one. A multi-level DOE with two discrete phase levels may be referred to as a binary DOE. Binary level DOEs are normally symmetrical, but with multi-level DOEs having more than two phase levels, it is possible to generate asymmetrical DOEs in addition to symmetrical DOEs. Further, it is possible to store more data, including encypted data, in a multi-level DOE, and a multi-level DOE has improved performance with regard to the projected image. Larger, brighter, higher contrasting and animated DOEs can be generated with multi-level DOEs produced by printing and embossing a radiation curable ink in accordance with the invention.

In one particular embodiment, the security device may be a transmissive device, such as a transmission DOE which produces a projected image in the remote reconstruction plane when viewed in transmission with collimated light from a point light source or a laser. Such a transmission DOE may be formed from a clear or transparent embossable UV curable ink. In another embodiment, when a metallic ink is used, the embodiment metallic ink applied to the transparent region of the substrate may be sufficiently thin to allow the transmission of light to enable a transmission DOE to be formed.

In the case of a half-window in which the transparent region is covered on one side by at least one opacifying layer, a security device formed from an embossed metallic ink may be a reflective device which is only visible in the half-window from the opposite side of the substrate, which is not covered by an opacifying layer in the half-window area.

It is also possible for the opacifying layer, which covers the half-window area on one side of the substrates, to allow the partial transmission of light so that the security device formed by the embossed ink is partially visible in transmission from the side, which is covered by the opacifying layer in the half-window area.

In a particularly preferred embodiment, the security device formed by the embossed radiation curable ink is a composite security device containing two or more different security elements.

According to another aspect of the invention, there is provided a security document or device, including a transparent plastic substrate and an area of embossed radiation cured ink applied to the substrate, wherein the embossed ink includes at least two different embossed relief structures each forming a different security element integrated within the same area to form a composite security device.

According to a further aspect of the invention, there is provided a method of manufacturing a security document or device comprising the steps of:

providing a transparent plastics substrate;

applying a radiation curable ink to at least one side of the substrate;

embossing the ink with at least two different embossed relief structures, each forming a different security element integrated within the same area to form a composite security device; and curing the embossed ink with radiation.

The radiation curable ink is preferably a transparent ink formed from a clear resin material. Alternatively or additionally, a metallic ink composition may be applied in a layer which is sufficiently thin to allow the transmission of light.

In one embodiment of the invention, the composite security device may include two or more different diffractive relief structures, e.g. selected from a diffraction grating, a hologram and a numerical-type diffractive optical element.

In another form of the invention, the composite security device may include an optically diffractive relief structure forming one security element, and a non-diffractive relief structure forming another security element. The other security elements may be an optically variable non-diffractive relief structure or a relief structure forming a lens or lenticular array.

In a particularly preferred embodiment, the security device formed from the embossed ink may include a verification means for verifying another security feature provided on the documents or device. In the case of a composite security device, the device may include an inspectable security elements and a verification means for verifying another security element on the documents.

The verification means preferably includes at least one lens. For example, the ink may be embossed with a relief structure forming a Fresnel lens or a magnifying lens, which can be used to verify an area of micro printing when the lens is superimposed over the security feature. Alternatively, the ink may be embossed with a lenticular array or an array of micro lenses, which can be used to verify a security feature in the form of an array of micro images, when the lenticular array or array of micro lenses is superimposed over the security feature.

In an alternative embodiment, the ink may be embossed with a diffractive relief structure, in the form of a diffractive filter or a holographic filter as a verification means. Such a filter may be used to verify a security feature in the form of an image which exhibits colour changing effects or a latent image, which becomes visible when the diffractive filter or holographic filter is superimposed over the security feature.

In the case of a half-window the security feature may be provided on the opposite side of the substrate from the verification means and in register with the verification means, so that the verification means is permanently superimposed over the security feature.

In the case of a flexible security document, such as a bank note or the like, which is foldable, if the verification means is provided in a full window area, the security feature may be provided on another part of the document which is laterally spaced from the verification means, whereby the security feature is only verifiable when the verification means is superimposed over the security feature, e.g. by folding.

BRIEF DESCRIPTION OF THE DRAWINGS

Some preferred embodiments of the present invention will now be described, by way of example only, with reference to the accompanying drawings, in which.

DETAILED DESCRIPTION OF THE DRAWINGS

Figure 1:
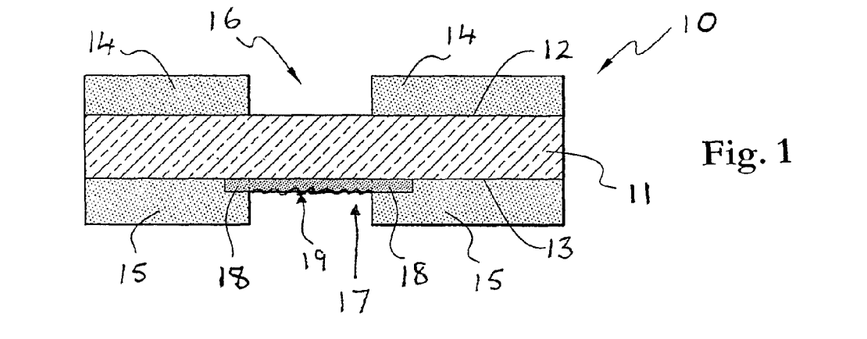
FIG. 1 is a schematic section through a security document with an integrated security device in the form of an embossed ink in a window area.

Referring to FIG. 1 there is shown a security document 10 comprising a substrate 11 of transparent plastic materials having a first or upper side 12 and a second or lower side 13. The transparent substrate is preferably formed from a transparent polymeric material such as a laminated structure of two or more layers of bi-axially oriented polypropylene. It will, however, be appreciated that other transparent or translucent polymeric substrates may be used in the present invention such as polyethylene and polyethyleneterephthalate (PET).

Opacifying layers 14 and 15 are applied respectively to the first and second sides 12 and 13 of the transparent substrate 11 with the opacifying layers 14 and 15 omitted in one region of the substrates to form a window area 16 in which a security device 17 is provided.

The security device 17 is formed from an embossable ink composition 18 applied on one side 13 of the substrate within the window area, and the ink composition 18 is embossed with a relief structure 19 to form the security device 17.

In a preferred method of manufacturing the security documents of FIG. 1, the ink composition, which preferably comprises a UV-curable transparent ink, is printed onto the side 13 of the transparent plastics substrate 11 and is embossed while soft and cured with UV radiation simultaneously before the opacifying layers 13 and 14 are applied to the substrate 11. Alternatively, the ink composition may comprise a UV-curable, embossable metallic ink composition, e.g. of the type manufactured by Wolstenholme International Limited. Such a metallic ink composition may be used when it is required to produce a reflective security device such as a reflective diffraction grating or hologram.

In some applications, an intermediate primer layer (not shown) may be applied to the surface 13 of the transparent substrate 11 before the embossable ink composition 18 is applied to improve the adhesion of the resulting embossed security device to the substrate.

In an alternative method, the opacifying layers 14 and 15 could first be applied to the opposite sides 12 and 13 of the substrate 11 with the ink composition 18 being printed on the window area 16 of the substrate 11 and then embossed and cured with UV radiation.

The opacifying layers 14 and 15 may comprise any one or more of a variety of opacifying coatings. For example, the opacifying coatings may comprise a pigment, such as titanium dioxide, dispersed within a binder or carrier of heat-activated cross-linkable polymeric material. Alternatively, the substrate 11 of transparent plastic material could be sandwiched between opacifying layers of paper to which indicia may be subsequently printed or otherwise applied. It is also possible for the security documents to be formed from a paper or fibrous substrate which has an area cut-out with a transparent plastics insert inserted into the cut-out area to form a transparent window to which the ink composition is applied and embossed to form the security device 17.

The security device 17 formed from the embossed ink composition 18 may include one or more of a variety of relief structures to form different security elements, including diffractive structures such as diffraction gratings, holograms and numerical-type diffractive optical elements (DOEs). Alternatively or additionally, the security device 17 may include other relief structures such as lens structures and optically variable non-diffractive relief structures.

Figure 10:
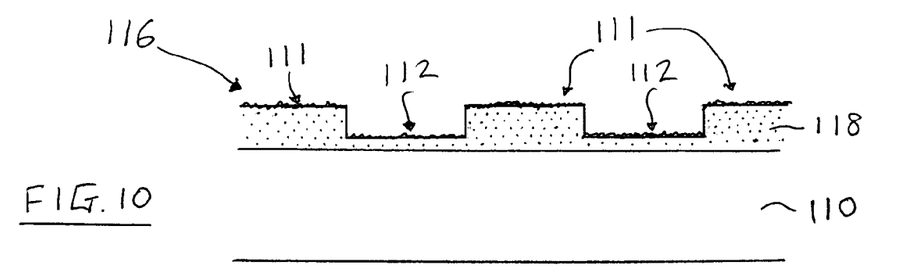
FIG. 10 is a schematic view of an embossed binary DOE in a security document produced in accordance with the invention.
Figure 11:
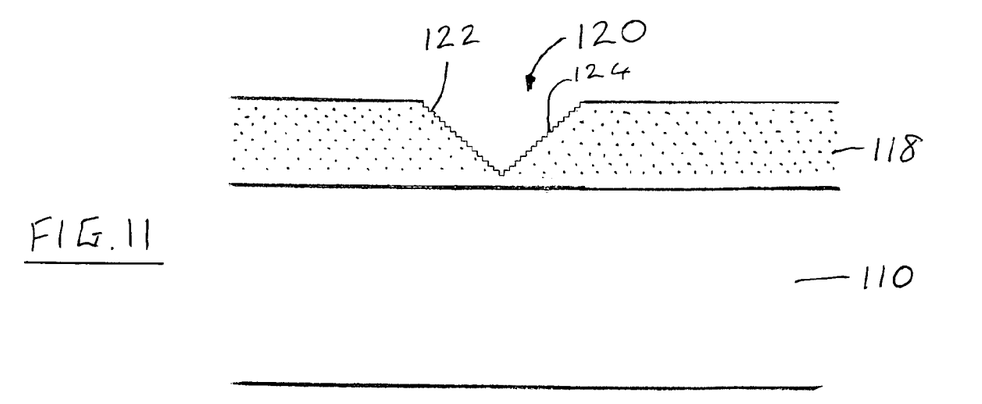
FIG. 11 is a schematic view showing an embossed multi-layer DOE in a security document.
Figure 12:
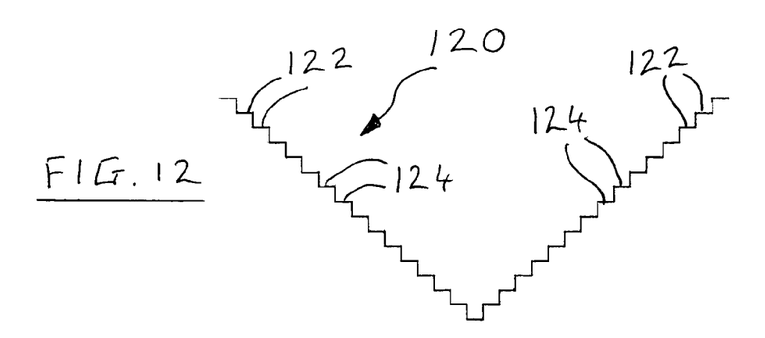
FIG. 12 is an enlarged view of the multi-layer DOE of FIG. 11.

In a particularly preferred embodiment, the security device 17 includes a multilayer diffractive optical element (DOE), examples of which are shown in FIGS. 10 to 12. Hitherto, it has only been possible to form single layer centro-symmetric DOEs in security documents by laser ablation of a surface of the document. However, the method of embossing a radiation curable ink or lacquer when soft and curing the ink or lacquer of the invention enables multi-layer DOEs and non-centro-symmetric DOEs to be formed by embossing. A multi-level DOE is a diffractive optical element with a discrete number of phase levels wherein the number is an integer greater than one. FIG. 10 shows a security document having a substrate 110 and a binary DOE 116 having two discrete phase levels 111 and 112 formed by embossing a coating of UV curable ink 118 applied to the substrate 110. The discrete phase levels 111, 112 of the binary DOE 118 are formed by embossing each level to a different surface relief depth.

FIGS. 11 and 12 show a security document having a multi-level DOE 120 with 16 phase levels 122,124 embossed into a UV curable ink 118 applied to the substrate 110. The multiple phase levels 122,124 each have a discrete surface relief depth and 16 phase levels provide 16 bit storage of data. At least some of the phase levels 122 may generate a projected visual image which is visible in a reconstruction plane when the multi-level DOE 120 is illuminated with collimated light, such as from a laser, an LED or other point light source. It is also possible for at least some phase levels 124 to store encrypted data. A multi-layer DOE, such as illustrated by FIGS. 10-12 enables the DOE to store more information and to be provided over a larger area, thereby providing stronger, brighter and more effective DOEs which may also generate animated or moving images. Further, multi-level DOEs which have more than two phase levels may be asymmetrical or symmetrical, whereas single phase and binary DOEs are limited to symmetrical DOEs.

Figure 2:
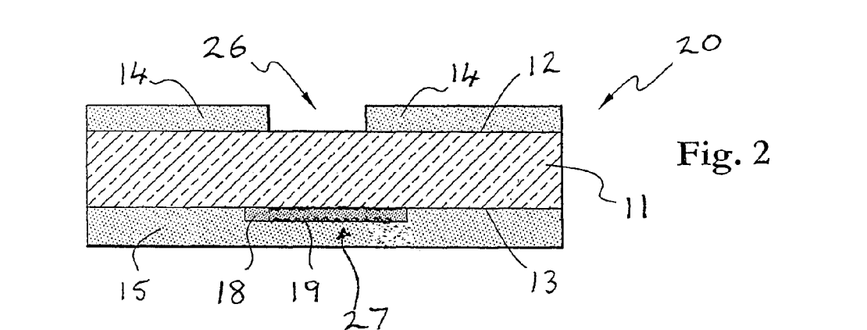
FIG. 2 is a schematic section through a modified security document with an integrated security device formed from an embossed ink in a half-window area.

FIG. 2 shows a modified security document 20 which is similar to the security document of FIG. 1, and corresponding reference numerals have been applied to corresponding parts. FIG. 2 differs from FIG. 1 in that the opacifying layer 15 is applied to cover the side 13 of the transparent substrate completely in the area of an embossed metallic ink 18, but the opacifying layer 14 on the opposite side 12 of the substrate 11 is omitted in the area of the embossed metallic ink 18 to form a half-window area 26.

The security device 27 formed from the embossed metallic ink 18 in FIG. 2 preferably includes at least one reflective security element which is visible from one side of the security document, i.e. the side corresponding to the side 12 of the substrate 11 to which the opacifying layer 14 is only partially applied. The security device 27 may be either completely invisible or partially visible from the opposite side of the substrate, depending upon the thickness and opacity of the opacifying layer 15 which is applied to the opposite side 13 of the substrate 11.

The security document 20 may be manufactured by first printing the UV curable metallic ink 18 on the transparent substrate 11 in the region which is to become the half-window 26, then embossing and curing the metallic ink 18 simultaneously to form the embossed relief structure 19, and then applying the opacifying layers 14 and 15 to the substrate 11. Alternatively, a UV curable transparent ink may be printed on one side of the transparent substrate in the half-window region, embossed and simultaneously cured and then a metallic ink composition may be applied to the embossed transparent ink before the opacifying layer 15 is applied. As shown in FIG. 2, these methods have the advantage that the embossed relief structure 19 of the metallic ink 18 is protected by the opacifying layer 15 which completely covers the metallic ink 18. However, in an alternative method the metallic ink could be applied to the opposite surface 12 of the transparent substrate 11 in the half-window area either before, during or after the application of the opacifying layer 14. In this case, it may be necessary to apply a protective coating, such as a transparent gloss varnish over the security device formed from the embossed metallic ink.

Figure 3:
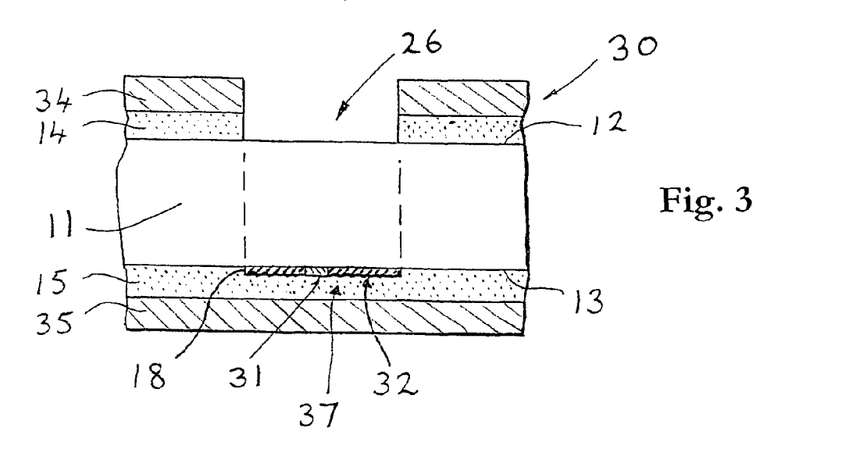
FIG. 3 is a schematic section through another security document with an integrated composite security device formed from an embossed ink in a half-window area.

FIG. 3 shows another embodiment of a security document 30 in accordance with the invention which is similar to the document 20 of FIG. 2 and corresponding reference numerals have been applied to corresponding parts. The security document 30 differs from that of FIG. 2 in that the security device 37 formed by the embossed ink 18 is a composite security device containing two different security elements 31 and 32.

FIG. 3 also differs from FIG. 2 in that additional layers 34 and 35 are applied to the opacifying layers 14 and 15. The layers 34 and 35 may be additional opacifying layers, e.g. pigmented coatings containing titanium dioxide when it is desired to increase the opacity of the security document except in the half-window area 26. Alternatively, the additional layers 34 and 35 may be layers of printed indicia.

In a particularly preferred embodiment, the composite security device includes two or more different reflective diffractive relief structures forming the different security elements 31 and 32. For example, the first security element 31 of the composite security device 37 shown centrally in FIG. 3, may be a numerical-type diffractive optical element (DOE) with the second security element 32 comprising a hologram. It is also possible for the composite security device to include other combinations of different diffractive structures, such as a DOE and a diffraction grating, or a hologram and a diffraction grating. It is also contemplated that the composite security device 37 could include an optically diffractive relief structure forming one security element, and a non-diffractive relief structure forming another security element. For example, the first security element 31 could be a DOE which is only detectable in reflection when the security device is illuminated by a collimated light source, such as a laser or a point light source, with the second security element 32 consisting of a non-diffractive optically variable relief structure which is visible at all times from one side of the security document in the half-window area 26. Further, it is also possible for the composite security device 37 to contain more than two different security elements, e.g. a DOE, a hologram or diffraction grating, and a non-diffractive security element.

Figure 4:
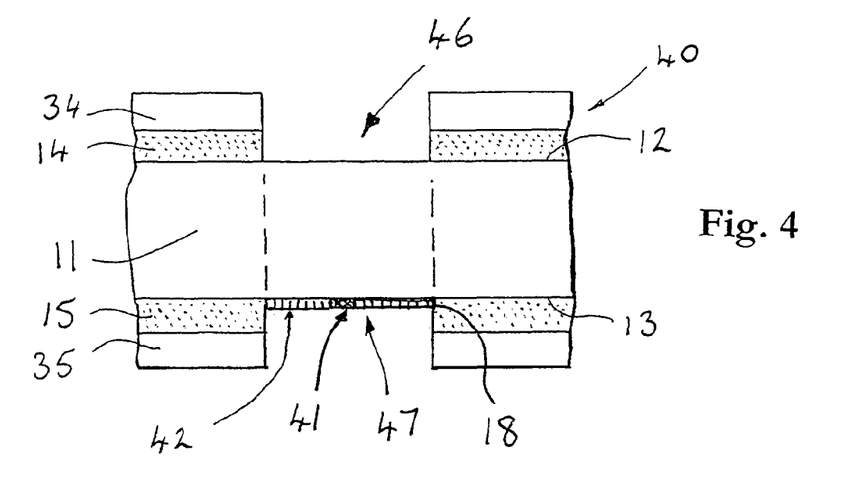
FIG. 4 is a schematic section through a security document with an integrated composite security device in a full window.

FIG. 4 shows a further modified security document 40 which is similar to the security document 30 of FIG. 3, and corresponding reference numerals have been applied to corresponding parts. The security document 40 differs from that of FIG. 3 in that the opacifying layers 14 and 15 and additional layers 34 and 35 have been omitted on both sides 12 and 13 of the substrate 11 in the region of the composite security device 47 to form a full window 46 so that the composite security device 47 is visible from both sides of the security document 40.

In one preferred embodiment, the composite security device 47 is formed from an embossable UV curable transparent ink which is embossed with the desired relief structure of the first and second security elements 41 and 42.

In a particularly preferred embodiment, the first security element 41 is an inspectable security element, such as a DOE, and the second security element 42 is a verification means for verifying another security feature on the document as will be explained in more detail with reference to FIGS. 6 to 9.

In another embodiment, the security device 47 may be formed from a metallic ink 18 applied to the transparent substrate 11 in the region of the window 46 in a layer which is sufficiently thin to allow the transmission of light. This allows not only the first security element 41, e.g. a DOE, to be viewed in transmission, but also allows the second security element 42 to form a verification means which allows the transmission of light, such as a lens structure or a filter, such as a diffractive or holographic filter.

It will, however, be appreciated that the composite security device 47 provided in the window 46 does not necessarily have to allow the transmission of light. For example, the first and second security elements 41 and 42 could be only reflective relief structures such as described with reference to FIG. 3, but the full window 46 allows such reflective security elements to be viewed from both sides of the security document.

Figure 5:
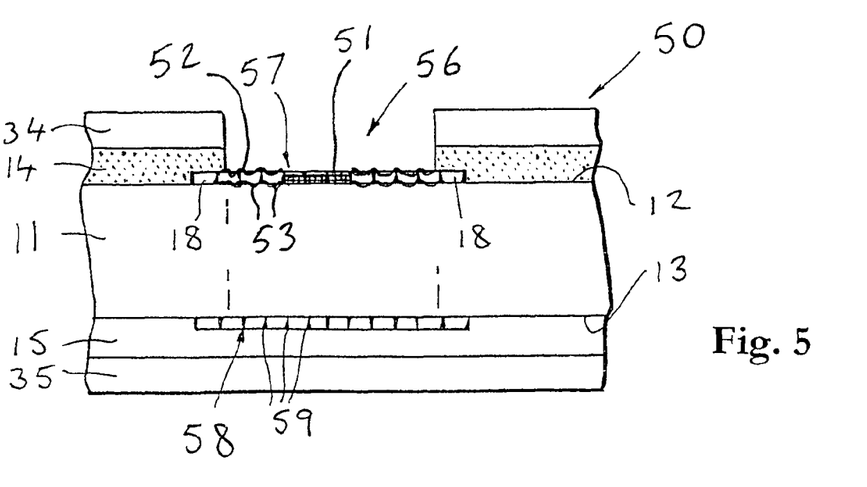
FIG. 5 is a schematic section through a security document with an integrated composite security device including an array of lenses and a diffractive security element in a half-window.

Referring to FIG. 5 there is shown a further modified security document 50 which is similar to the document 30 of FIG.

3 with corresponding reference numerals applied to corresponding parts. The security document 50 differs from that of FIG. 3 in that the composite security device 57 is provided on the same side of the transparent substrate 11 as the half-window 56, with a further security element 58 provided on the opposite side 13 of the transparent substrate 11 which is completely covered by the opacifying layers 15 and 35 in the half-window area.

The further security element 58 is preferably in the form of an element which interacts with at least one of the first and second security devices 51 and 52 of the composite security device 57. In one embodiment the first security element 51 may comprise a reflective diffractive structure, such as a DOE or hologram, and the second security element 52 may comprise a lens structure with the further security element 58 comprising a security feature which can be verified, inspected or enhanced by the lens structure 52. For example, the further security element 58 may comprise an area of micro printing, with the second security element comprising a Fresnel lens or a magnifying lens for magnifying a viewing the micro printing. Alternatively, the second security element 52 may comprise a lenticular array, such as an array of microlenses 53 with the second security element comprising an array of micro-images 59 in register with the micro lenses such that the micro-images 59 can be viewed through the lenticular array 52. The micro-images 59 may be formed by a variety of different methods. The micro images 59 could be printed onto the surface 13 of the transparent substrate; or they could be markings formed a laser, eg by laser blackening, laser colouration or ablation.

The micro-images 59 may be clear, coloured or black, or a combination of the above. The combination of microlenses 53 and micro-images 59 may produce a magnified image of the individual micro-images by a process known as Moire magnification. It is also possible for the combination of microlenses 53 and micro-images 59 to produce moving or floating images.

In another possible embodiment, the micro-images 59 may be replaced by a hologram structure 58, such as an embossed reflective rainbow hologram, which in combination with the array of microlenses 53, can produce some interesting optical effects.

Figure 6:
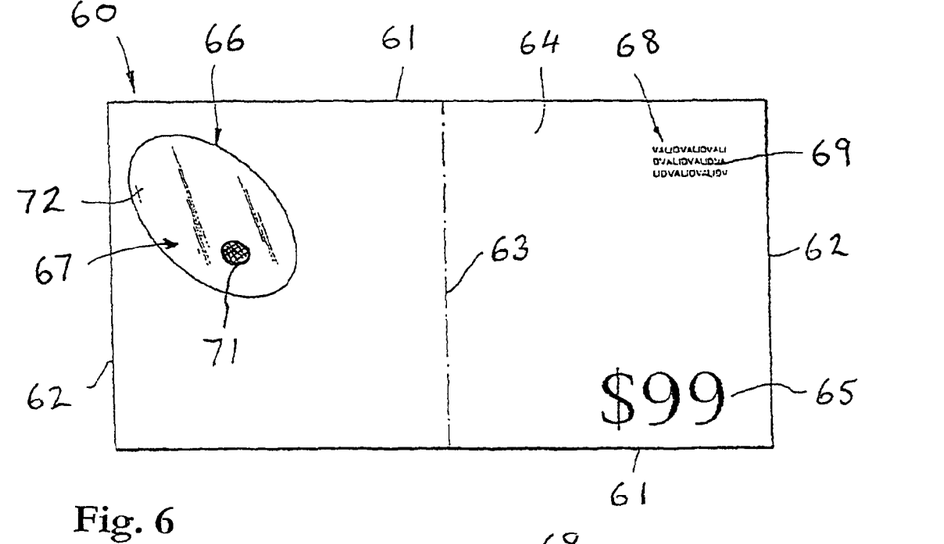
FIG. 6 is a plan view of a foldable self-verifying security document with an integrated composite security device including a lens structure in a window for verifying a security element at another part of the document.
Figure 7:
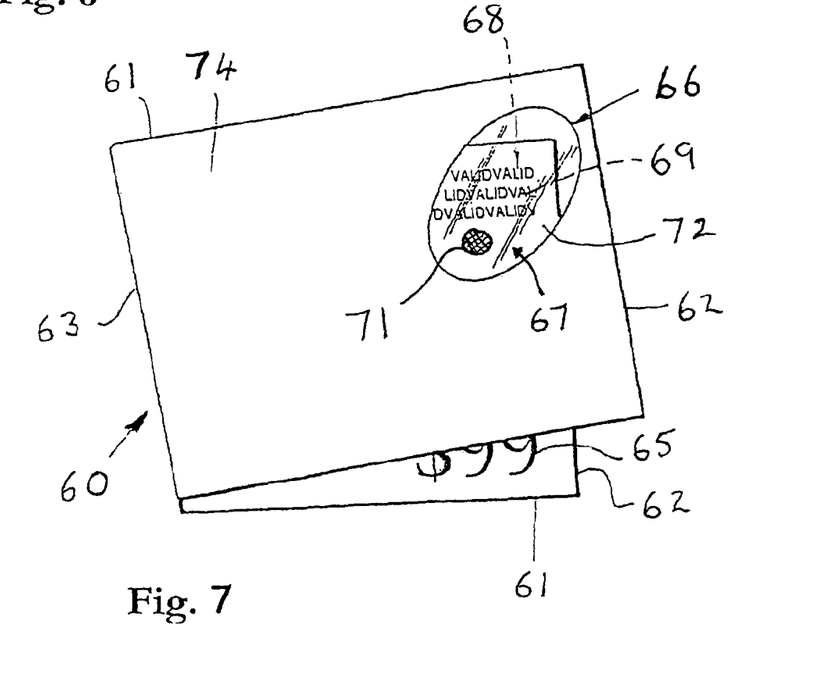
FIG. 7 is a view of the document of FIG. 6 folded for verification.

FIGS. 6 and 7 show a rectangular security document in the form of a bank note having side edges 61 and end edges 62. The bank note 60 comprises a flexible sheet which can be folded, e.g. about a central fold line 63 extending parallel to the end edges 62 as shown in FIG. 7. The upper surface 64 and the lower surface 74 of the bank note 60 are printed with indicia 65. The bank note 60 has a transparent window 66 in which a composite security device 67 is integrated. The window 66 and the composite security device 67 are preferably formed in the same manner as described with reference to FIGS. 1 and 4. The composite security device 67 includes a first security element 71 in the form of a diffractive structure, such as a DOE, and a second security element 72 in the form of a lens structure. The bank note 60 also has a further security feature 68 in the form of an area of micro printing 69 provided at a region of the bank note which is laterally spaced from the composite security device. The arrangement of the composite security device 67 and the further security feature 68 is such that when the bank note is folded about the central fold line so that the composite security device is superimposed over the security feature 68, the micro printing 69 is magnified by the lens structure 72 and becomes visible so that the authenticity of the bank note can be verified.

Figure 8:
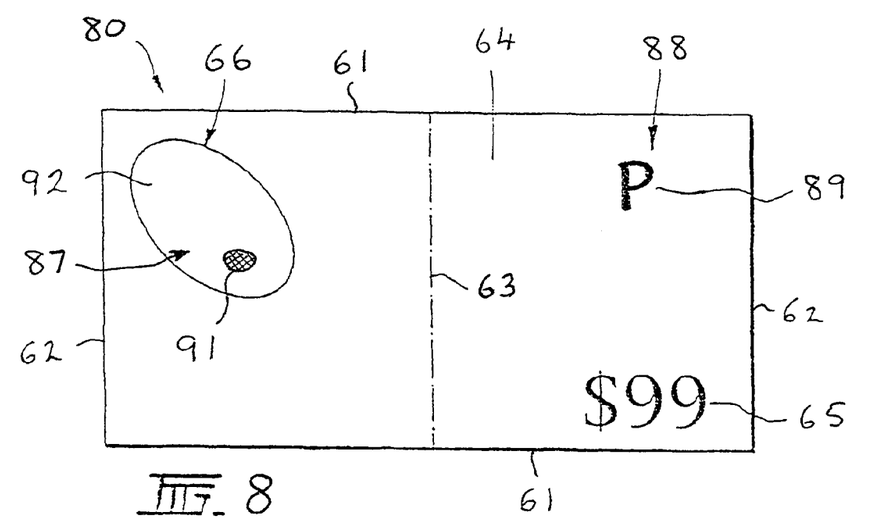
FIG. 8 is a plan view of a foldable security document with an integrated composite security device incorporating a filter for verifying a security element at another part of the document.
Figure 9:
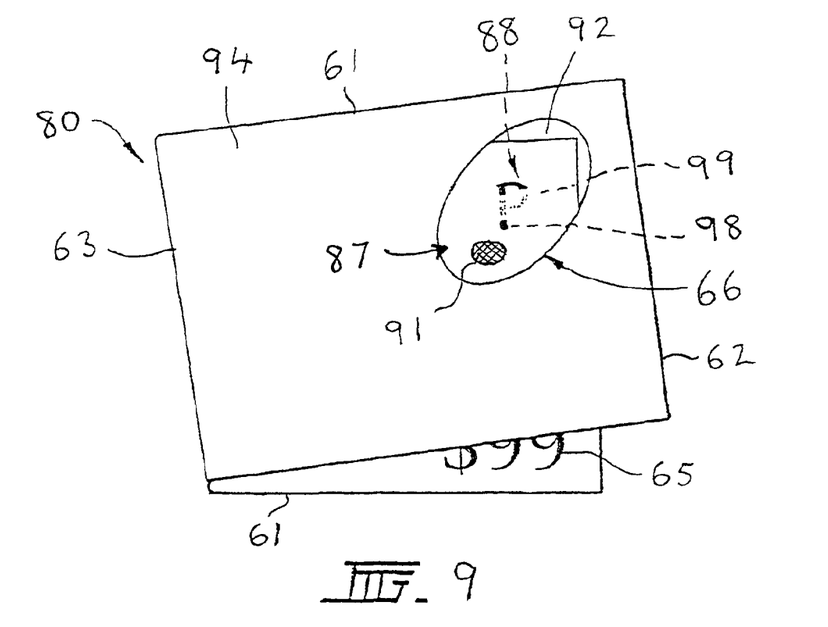
FIG. 9 is a view of the document of FIG. 8 folded for verification.

FIGS. 8 and 9 show another self-verifying bank note 80 which is similar to the bank note 60 of FIGS. 6 and 7 and corresponding reference numerals have been applied to corresponding parts. The bank note 80 differs from that of FIGS. 6 and 7 in the form of the composite security device 87 and the further security feature 88. The first security element 91 of the composite security device 87 is in the form of an inspectable relief structure, preferably in the form of a diffractive structure such as a DOE or a hologram, and the second security element 92 of the composite security device is in the form of a filter, preferably a diffractive or holographic filter. The further security feature 88 preferably comprises a dichroic feature, eg an image printed from metameric inks. Dichroic features and metameric inks have the unique property of appearing to change colour when viewed in different lighting conditions or in different spectral environments. For example, two inks with different metameric properties may appear to be an identical colour when viewed in a particular white light environment, e.g. daylight, but when viewed in different lighting conditions, e.g. in filtered light, the two inks will appear to have different reflective colours so that one ink appears in a colour distinguishable from the other.

As in FIGS. 6 and 7, the composite security device 87 and the further security feature 88 are located at laterally spaced locations on the bank note and are arranged so that when the bank note 80 is folded about the central fold line 63, the composite security device 87 is superimposed over the further security feature 88, and the colour changing properties of the further security feature become apparent when the printed image 89 is viewed through the second security element in the form of the filter 92. As shown in FIGS. 8 and 9, the image 89 printed with metameric inks may be a permanent image which appears a single colour when viewed in ambient light, with part of the image 99 appearing a different colour from the remainder of the image 98 when the filter of the composite security device is superimposed over the further security feature 88. Alternatively, it is possible for the further security feature 88 to be a latent image which becomes visible when viewed through the filter of the second security element 92 when the bank note 80 is folded to superimpose the composite security device 87 over the further security feature 88.

Although it may be possible for the second security element 92 of the composite security device to be in the form of a colour-tinted filter, preferably the second security element comprises a holographic or diffractive filter which can provide a clearer or sharper image when verifying the image 89 of the further security feature 88.

The use of an embossable ink which can be embossed with diffractive structures to form the composite security device 87 particularly lends itself to the integration of the composite security device 87 into the window area 66 of the security document of FIGS. 8 and 9. Also, it is possible to locate different security elements closer together in the composite security device than when other methods of forming security devices are used. For instance, separations of less than 0.3 mm and as low as 0.1 mm have been achieved between the different security elements of the composite security device. Further, the embodiments of FIGS. 6 and 7, and 8 and 9 provide the advantage of a composite security device having a first security element which can be readily inspected, such as a DOE or hologram, and a second security element in the form of a verification means which can be used to verify another security feature at a laterally spaced location on the bank note.

The apparatus for embossing the UV curable ink to form the embossed structure may include a shim or a seamless roller. The shim or roller may be manufactured from any suitable material, such as nickel or polyester.

Preferably, the nickel shims are produced via a nickel sulphamate electroplating process. The surface of a photoresist glass plate holding a microscopic structure used to form a DOE or array of microlenses may be vacuum metallised or sprayed with pure silver. The plate may then be placed in a nickel sulphamate solution and over a period of time molecules of nickel are deposited on the surface of the silver-coated photoresist, resulting in a master copy. Subsequent copies may be used in transferring the image for reproduction, or transferring to ultraviolet polyester shims or to make a seamless roller.

Polyester shims may be made by coating polyester with an ultraviolet curable lacquer and contact copying the master image and curing the transferred image by means of ultraviolet light.

Seamless cylinders may be made using a metallised transfer film with a sub-microscopic diffractive pattern or a microscopic lens pattern for microlenses thereon, which may be fixed and transferred to a cylinder coated with an adhesive. The metallised transfer film may be glued to the roller via a nip. The adhesive may then cured, preferably by heat. Once cured the transfer film is removed leaving the metallised layer with the sub-microscopic or microscopic pattern on the surface of the cylinder ie the roller. This is repeated until the cylinder is completely covered. This cylinder then may be placed in a casting tube and cast with silicone to make a mould. The sub-microscopic or microscopic pattern may be moulded to the inside surface of the silicone.

Once the silicone is cured the mould is removed and placed in a second casting tube. A casting roller may then be placed in the mould and cast with a hard resin, preferably cured with heat. Once cured the roller can be removed from the mould, where the pattern in the inside surface of the silicone has transferred to the outside surface of the resin cylinder and is ready for use, to transfer the sub-microscopic diffractive pattern or lens pattern on the surface of the cylinder into the surface of a printed ultraviolet curable lacquer on the first surface of a substrate.

In another embodiment a cylinder is coated with ultraviolet curable resin, placing a clear transfer film with a sub-microscopic diffractive pattern or a lens pattern to the surface of the ultraviolet resin via a nip and cured with ultraviolet light. The cylinder can then be subsequently cast, as described above and used to directly transfer the pattern into the surface of a printed ultraviolet cured lacquer on the first surface of a substrate.

The upper surface of the substrate may be printed with the embossable UV curable ink in discrete register with the window or half-window area, so that other subsequent printing can take place on non-registered areas as images/patterns outside the window or half-window area. The substrate may then pass through a nip roller to a cylinder carrying a sub-microscopic diffractive pattern or a lens pattern or image in the form of a nickel or polyester shim affixed to the surface of a cylinder. In a preferred embodiment the patterns are held on a seamless cylinder so that the accuracy of the transfer can be improved. The sub-microscopic diffractive pattern or lens pattern may then be transferred from the shim or seamless roller into the surface of the exposed ultraviolet curable lacquer by means of bringing the surface of the shim or seamless roller into contact with the surface of the exposed ultraviolet curable lacquer. An ultraviolet light source may be exposed through the upper surface of the filmic substrate and instantly cures the lacquer by exposure to ultraviolet light. The ultraviolet light sources may be lamps in the range of 200 watts to 450 watts disposed inside the cylinder, curing through the printed ultraviolet lacquer and fixing the transferred sub-microscopic diffractive pattern or lens pattern.

The method described above in which embossed relief structure security devices are formed by printing a transparent radiation curable ink onto a sheet, embossing the ink while still soft and simultaneously curing the ink with radiation, allows multiple security features to be formed in a sheet of banknotes or other security documents in which the security features are more accurately in register with the window or half-window areas of the individual documents of the sheet compared to other methods of applying embossed security devices such as diffraction gratings or holograms by transferring the security devices from a transfer sheet onto the security documents. This, in the present invention, is due at least in part to the registration of the security device being generated as an integral step of the printing process, and not being subject to issues of sheet fed registration in which tolerances are commonly greater than 1 mm.

It will be appreciated that various modifications and alterations may be made to the embodiments of the present invention described above without departing from the scope and sprit of the present invention. For example, whilst the embodiments of FIGS. 6 to 9 have been described with particular reference to a security document in the form of a bank note, it will be appreciated that the various aspects and embodiments of the invention have application to other types of security and identification documents including, but not limited to the following: credit cards, cheques, passports, identity cards, securities and share certificates, driver's licenses, deeds of title, travel documents such as airline and train tickets, entrance cards and tickets, birth, death and marriage certificates, and academic transcripts.

The invention claimed is:

1. A security document comprising a substrate including at least one region of transparent or translucent plastics material forming a window or half-window area, and a security device integrated into the window or half-window area, wherein the security device comprises a composite security device formed from a continuous layer of embossed radiation curable ink containing first and second different embossed security elements in different regions of the embossed radiation curable ink on the same side of the substrate, wherein each of said first and second security elements corresponds entirely to a respective embossed region of the radiation curable ink, wherein the second security element is located within 0.3 mm of the first security element, and wherein the first security element comprises a diffractive structure, and the second security element comprises a lens structure or other non-diffractive security element having an embossed relief structure.

2. The security document according to claim 1, wherein the security device includes a verification means for verifying another security feature provided on the document.

3. The security document according to claim 2, wherein the verification means includes a lens, a lenticular array or an array of microlenses.

4. The security document according to claim 1, wherein the composite security device includes an inspectable security element and a verification means for verifying another security feature on the document.

5. The security document according to claim 1, wherein the document is a banknote.

6. The security document according to claim 1, wherein the security device is integrated into a half-window area of the substrate.

7. The security document according to claim 1, wherein the second security element is located within 0.1 mm of the first security element.

8. The security document according to claim 1, wherein the security device includes a light transmissive security element.

9. The security document according to claim 8, wherein the security device is formed from an embossed transparent ink.

10. A method of manufacturing a security document comprising the steps of:
- providing a substrate including at least one region of transparent plastics material forming a window or half-window area;
- applying a radiation curable ink directly to at least one surface of the substrate in at least the window or half-window area; and
- simultaneously embossing the ink and curing with radiation to form a security device within the window or half-window area, wherein the embossed ink forms a composite security device containing first and second different security elements in different regions of the embossed ink on the same side of the substrate, wherein the first security element comprises a diffractive structure, and the second security element comprises a lens structure or other non-diffractive relief structure.

11. A method according to claim 10, wherein at least one opacifying layer is applied to at least one side of a transparent polymeric substrate with the at least one opacifying layer omitted in the region forming the window or half window area.

12. A method according to claim 11, wherein opacifying layers are applied to opposite sides of the substrate with the opacifying layers on both sides of the substrate omitted in one region to form a transparent window in the security document.

13. The method according to claim 10, wherein the radiation curable ink is applied in a window area of the substrate.

14. The method according to claim 10, wherein the radiation curable ink is applied in a half-window area of the substrate.

15. The method according to claim 10, wherein the radiation curable ink is a transparent ink or lacquer formed from a clear resin material.

16. The method according to claim 10, wherein the radiation curable ink is applied in a Gravure printing process.

17. The method according to claim 10, wherein the radiation curable ink is a metallic ink composition applied in a layer which is sufficiently thin to allow the transmission of light.

* * * * *